(12) United States Patent
De Gaillard et al.

(10) Patent No.: US 11,598,348 B2
(45) Date of Patent: Mar. 7, 2023

(54) FAN BLADE COMPRISING A THIN SHIELD AND A STIFFENER

(71) Applicant: SAFRAN AIRCRAFT ENGINES, Paris (FR)

(72) Inventors: Thomas Alain De Gaillard, Moissy-Cramayel (FR); Benjamin Bulot, Moissy-Cramayel (FR); Eddy Keomorakott Souryavongsa, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/413,377

(22) PCT Filed: Dec. 13, 2019

(86) PCT No.: PCT/FR2019/053061
§ 371 (c)(1),
(2) Date: Jun. 11, 2021

(87) PCT Pub. No.: WO2020/120921
PCT Pub. Date: Jun. 18, 2020

(65) Prior Publication Data
US 2022/0025900 A1    Jan. 27, 2022

(30) Foreign Application Priority Data
Dec. 14, 2018 (FR) ....................... 1872945

(51) Int. Cl.
*F01D 5/14* (2006.01)
*F04D 29/38* (2006.01)
(Continued)

(52) U.S. Cl.
CPC ........... *F04D 29/388* (2013.01); *F01D 5/147* (2013.01); *F01D 5/282* (2013.01); *F01D 21/045* (2013.01);
(Continued)

(58) Field of Classification Search
CPC ............... F01D 5/147; F05D 2240/303; F05D 2240/304
(Continued)

(56) References Cited

U.S. PATENT DOCUMENTS 9,027,245 B2 * 5/2015 Hottier ...................... F01D 5/00
29/889.7
9,470,097 B2 * 10/2016 Hodgson ............... F01D 21/045
(Continued)

FOREIGN PATENT DOCUMENTS

EP    2 159 378 A2    3/2010

*Primary Examiner* — Michael L Sehn
(74) *Attorney, Agent, or Firm* — Birch, Stewart, Kolasch & Birch, LLP

(57) ABSTRACT

The invention relates to a fan blade (1) comprising: —an aerofoil (8) made of a composite material comprising a fibrous reinforcement densified by a polymer matrix, a leading edge (4) and a trailing edge (5), and —a structural shield (10) fitted and attached to the leading edge (4) or the training edge (5), and —at least one stiffener (20) formed integrally and in one piece with the structural shield (10), said stiffener (20) extending in a cavity (15) formed between the shield (10) and the leading edge (4) or the trailing edge (5) so as to increase a stiffness of the blade (1).

21 Claims, 2 Drawing Sheets

(51) Int. Cl.
*F01D 5/28* (2006.01)
*F01D 21/04* (2006.01)
*B33Y 80/00* (2015.01)

(52) U.S. Cl.
CPC .......... *B33Y 80/00* (2014.12); *F05D 2220/36* (2013.01); *F05D 2240/303* (2013.01); *F05D 2240/304* (2013.01); *F05D 2300/603* (2013.01)

(58) Field of Classification Search
USPC ........................................................ 416/224
See application file for complete search history.

(56) References Cited

U.S. PATENT DOCUMENTS

| | | | |
|---|---|---|---|
| 9,874,103 B2 * | 1/2018 | Leconte | ................. B23K 9/167 |
| 2014/0030105 A1 | 1/2014 | Fameau et al. | |
| 2015/0086377 A1 | 3/2015 | Leconte et al. | |

* cited by examiner

FAN BLADE COMPRISING A THIN SHIELD AND A STIFFENER

FIELD OF THE INVENTION

The invention relates generally to the field of turbomachines, and more particularly to that of the fan blades of these turbomachines and their manufacturing method.

The invention applies more particularly to fan blades made of a composite material or a metallic material, the leading edge of which includes a structural metal shield.

TECHNOLOGICAL BACKGROUND

A fan blade of a turbomachine includes an airfoil having a leading edge, a trailing edge and pressure side and suction side lateral faces which connect the leading edge to the trailing edge.

Turbomachine blades, and particularly fan blades, undergo high, mostly mechanical stresses, resulting particularly from aerodynamic forces, dynamic stresses e.g. centrifugal stresses, and in some cases thermal stresses. These blades must satisfy strict weight and bulk requirements. It has therefore been proposed to use blades of a composite material including a fibrous reinforcement densified by a polymer matrix, which are therefore lighter and which have better resistance to stresses than metal blades having an equivalent mass.

During the certification and the lifetime of an engine, the fan blades are subjected to bird ingestion. The mechanical behavior of the fan blades is therefore optimized during their design phase to satisfy the certification rules.

It is known to equip fan blades made of a composite material with a structural metal shield extending over the entire height of the airfoil and beyond its leading edge, as mentioned in document EP 1 908 919, and comprising a leading edge configured to face the leading edge of the airfoil, as well as fins configured to be supported against the pressure side and the suction side of the blade. A shield of this type allows in particular protecting the leading edge and avoiding the risk of delamination, of fiber breakage or even of damage by loss of fiber/matrix adhesion. This shield further participates in the stiffness of the blade which is necessary in particular for frequency aspects and deflection upon impact, as well as the aerodynamic properties of the blade, by allowing thinning of the leading edge.

From the point of view of aerodynamic performance, reduction of the thicknesses of the upstream (leading edge) and downstream (trailing edge) ends of a blade allows a gain in aerodynamic efficiency as well as in behavior. In fact, the implementation of a so-called thin edge technology allows limiting the deflection of the profile which causes a Mach number peak in the transonic and supersonic sections (at the tip of the blade) harmful to the performance of the fan. Moreover, reduction of the thickness of the trailing edge allows reducing aerodynamic base losses (profile losses at the trailing edge) mainly for sections above 60% of height.

The impact of this type of technology is directly linked to the efficiency of the turbomachine and therefore its fuel consumption.

Yet, when blades, particularly fan blades, are made of composite material, it is difficult to obtain small thicknesses, (i.e. on the order of one to two millimeters) while retaining optimal mechanical resistance of the leading edge (or of the trailing edge) of the airfoil. In fact, from a mechanical point of view and taking into account certification requirements, it is necessary that the leading edge and the trailing edge be able to resist and limit damage to the blade when they are subjected to various forces such as bird impacts or the repetition of flight cycles (lifetime). This difficulty in obtaining a small thickness is explained by the thickness of the strands used to produce the fibrous reinforcement (a strand being constituted of several thousand fibers, generally carbon, and having a thickness on the order of a millimeter) and by the number of layers necessary for ensuring good mechanical resistance. It is in fact more difficult to obtain optimal properties by interlacing two layers than by interlacing a larger number of layers.

The shield already allows thinning the leading edge of the blade. In fact, the shield is generally made of metal, which allows smaller thicknesses to be attained. However, to sufficiently thin the leading edge of the shield, it would be necessary to drastically increase its mass, considering the thickness of the leading edge of the airfoil from which the shield extends. The mass would be greater than with a large thickness of the shield, the extent of its nose will be large to have a tapered cross section. Yet in the event of an impact, particularly with birds of small size, there exists a considerable risk that the shield will detach locally from the airfoil and that the detachment will propagate over the height of the blade until complete detachment if a maintenance operation is not executed more or less rapidly.

SUMMARY OF THE INVENTION

An objective of the invention is therefore to propose a blade of a rotating portion of a turbomachine produced in a composite material comprising a fibrous reinforcement densified by a polymer matrix, and particularly of a fan, which has a small thickness at its leading edge and/or its trailing edge in order to improve the aerodynamic performance and the behavior of the blade, yet without penalizing the mass of the shield.

To this end, the invention proposes a blade of a rotating portion of a turbomachine, particularly a fan, said blade comprising:
- an airfoil made of a composite material comprising a fibrous reinforcement densified by a polymer matrix, a leading edge and a trailing edge
- a structural shield applied and attached to the leading edge or the trailing edge and
- at least one stiffener formed integrally and in a single piece with the shield, said stiffener extending into a cavity formed between the shield and one of the leading edge or the trailing edge and configured to be supported against the leading edge or the trailing edge so as to increase a stiffness of the blade.

Certain preferred but not limiting features of the blade described above are the following, taken individually or in combination:
- the blade has an aerodynamic surface, said aerodynamic surface having a main extension direction defining a longitudinal axis of the blade which is substantially radial to an axis of revolution of the rotating portion, and a height corresponding to a distance between a lower limit of the aerodynamic surface and a tip of the blade, the stiffener extending over only a portion of the height of said aerodynamic surface.
- the stiffener extends over at most 70% of the height, preferably over at most 60% of said height.
- the stiffener is adjacent to the tip of the blade.
- the stiffener and the shield are produced by additive manufacturing.

the stiffener comprises a series of walls forming at least one bellows.

the stiffener has an extension direction, said extension direction being substantially parallel to the leading edge or to the trailing edge.

the stiffener has an extension direction, said extension direction being substantially transverse to the leading edge or to the trailing edge.

the stiffener and the shield are metallic, of titanium for example.

the blade comprises a shield applied and attached to the leading edge, a shield applied and attached to the trailing edge, at least one stiffener formed integrally and in a single piece with the structural shield, said stiffener extending between the leading edge and the structural shield and at least one stiffener formed integrally and in a single piece with the structural shield, said stiffener extending between the trailing edge and the structural shield.

According to a second aspect, the invention proposes a fan comprising at least one blade as described above.

BRIEF DESCRIPTION OF THE DRAWINGS

Other features, aims and advantages of the present invention will be better revealed by reading the detailed description that follows, and with reference to the appended drawings given by way of non-limiting examples and in which.

DETAILED DESCRIPTION OF ONE EMBODIMENT

Figure 1:
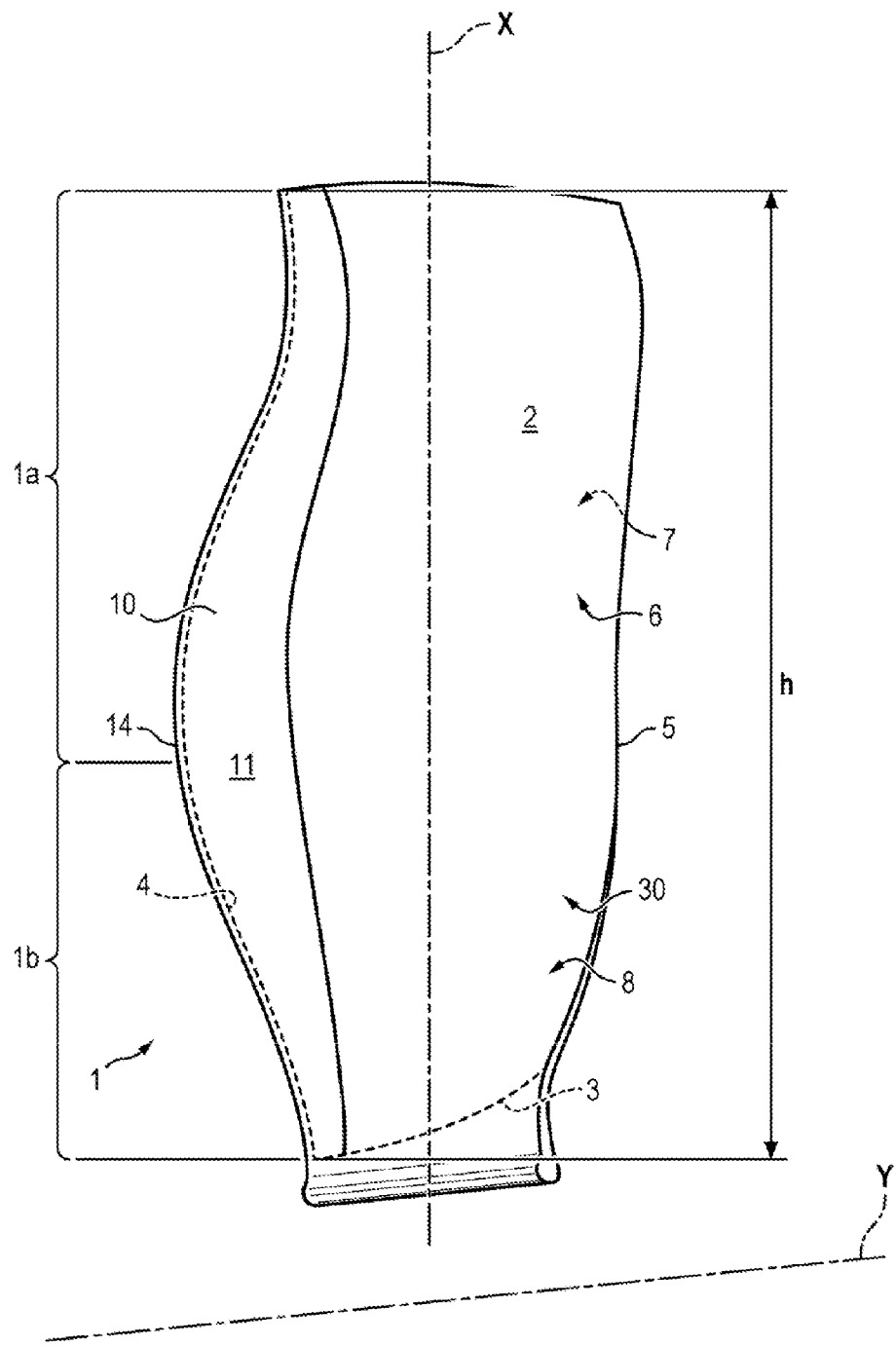
FIG. 1 is a side view of a first exemplary embodiment conforming to one embodiment of the invention.

Hereafter, the invention will be described more particularly in the case of a fan blade of a turbomachine. It will be understood, however, that the invention applies by analogy to blades of any rotating portion of the turbomachine, as long as these blades are made of composite material.

In a manner known per se, a fan blade 1 conforming to the invention includes an aerodynamic surface 2 between a blade 1 root and a blade 1 tip. The blade 1 also comprises an airfoil having a leading edge 4, a trailing edge 5, a pressure side wall 6 and a suction side wall 7. The leading edge 4 is configured to extend facing the flow of the gases entering into the turbomachine. It corresponds to the anterior portion of an aerodynamic profile which faces the flow of air and which divides the flow of air into a pressure side flow and a suction side flow. The trailing edge 5, for its part, corresponds to the posterior portion of the aerodynamic profile, where the pressure side and suction side flows rejoin one another.

The aerodynamic surface 2 of the blade 1 has a main extension direction, defining the longitudinal axis X of the blade 1 which is substantially radial to an axis of revolution Y of the fan. The aerodynamic surface 2 further has a height h corresponding to a distance between a lower limit 3 of the aerodynamic surface 2 and a tip of the blade 1, at an intersection between the leading edge 4 and the lower limit.

The airfoil is made of a composite material comprising a fibrous reinforcement densified by a polymer matrix.

The fibrous reinforcement can be formed from a fibrous preform obtained by three-dimensional weaving with a changing thickness. It can in particular comprise carbon, glass, aramid and/or ceramic fibers. The matrix, for its part, is typically a polymer matrix, for example epoxy, bismaleimide or polyimide.

The airfoil is then formed by resin vacuum injection molding of the RTM ("Resin Transfer Molding") or VARRTM (for Vacuum Resin Transfer Molding) type.

The blade 1 further comprises a structural shield 10 which is applied and attached to the leading edge 4 of the airfoil.

The shield 10 is a single-piece part comprising a substantially V-shaped cross section having a base 13, which can also be designated a "nose," configured to extend in the continuation of the leading edge 4 of the airfoil, as well as a pressure side fin 11 and a suction side fin 12 configured to mold themselves respectively to the pressure side 6 and suction side 7 walls of the airfoil. The fins can have a tapered or thinned profile in the direction of the trailing edge 5 of the airfoil.

The shield 10 extends over the entire height of the aerodynamic surface 2 of the airfoil 1. Conventionally, when the blade 1 is integrated into a fan, the radially internal portion of the flow stream is delimited by an inter-blade platform (shown in dashed lines in FIGS. 2 and 3). The aerodynamic surface 2 of the blade 1 then corresponds to the surface of the blade 1 extending between the tip of the blade 1 and the inter-blade platforms placed on either side of its root. Moreover, the lower limit 3 of the aerodynamic surface 2 of the blade 1 corresponds to the intersection between the blade 1 and the inter-blade platform.

As illustrated in the figures, the shield 10 molds itself to the shape of the leading edge 4 of the blade, which it continues to form a new leading edge, called the leading edge 14 of the shield 10. The shield 10 thus forms the anterior portion of the aerodynamic profile of the blade 1.

The shield 10 of the blade 1 is generally metallic, of titanium for example, in order to confer a high capacity for energy absorption due to possible shocks.

The shield 10 and the airfoil are produced separately. The shield 10 is then applied to the leading edge 4 of the airfoil and attached to it by gluing, for example by means of a cyanoacrylate or epoxy glue. To this end, the shield 10 has an internal profile adapted to mold itself to the rounded shape of the leading edge 4 of the blade 1, with or without contact with said leading edge 4. If necessary, joggling of the pressure side 6 and suction side 7 walls of the airfoil can be carried out in order to facilitate the assembly of the shield 10.

In order to allow the production of a fine leading edge on a blade 1 of composite material, yet without increasing the mass of the blade 1, the blade 1 further includes a stiffener 20 formed integrally and in a single piece with the structural shield 10. The stiffener 20 extends between the leading edge 4 and at least one inner face of the shield 10 by being supported against the leading edge 4 of the airfoil 8 so as to increase a stiffness of the blade 1.

It will be understood that the invention applies by analogy to the case where the shield 10 is applied to the trailing edge of the blade 1. For the sake of simplifying the description, the invention will however be described and illustrate only for the case where the shield 10 is applied to the leading edge 4. It will further be noted that a blade 1 can both comprise a shield 10 with a stiffener 20 on the leading edge 4 and a shield 10 with a stiffener on the trailing edge 5 of the airfoil 8.

Using a stiffener 20 allows reducing the mass of the base 13 of the shield 10 by creating a cavity 15 between the base 13 and the leading edge of the airfoil 8, and partially filling in this cavity 15 with a part (the stiffener 20) with low mass but which is capable of improving stiffness of the shield 10. It is therefore possible to increase the distance between the leading edge 14 of the shield 10 and the leading edge 4 of the airfoil 8, and consequently thinning the leading edge 14, yet without increasing the mass of the shield 10.

Figure 2A:
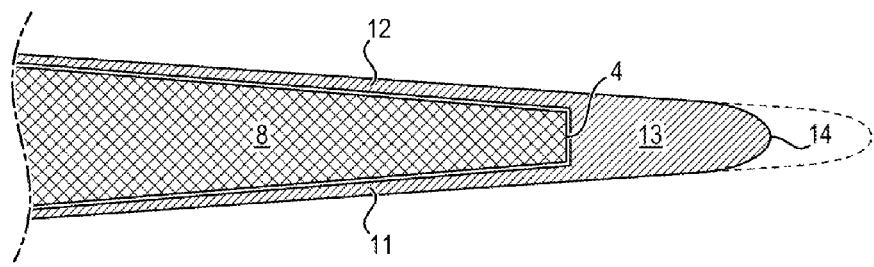
FIG. 2a is a transverse section view of a conventional blade.
Figure 2B:
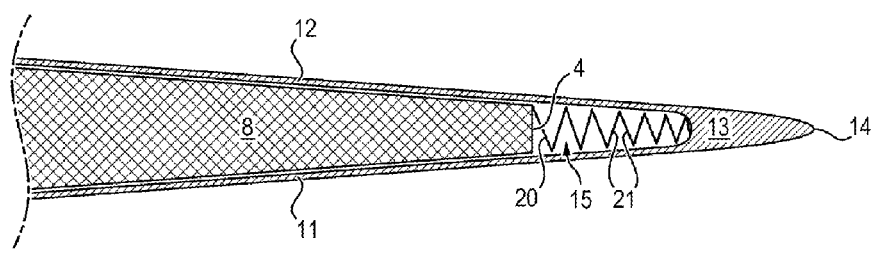
FIG. 2b is a transverse section view of the blade of FIG. 1, in a plane normal to the axis X of FIG. 1.

It is possible for example to refer to FIGS. 2a and 2b, which illustrate respectively a blade 1 lacking a stiffener 20 and a blade 1 according to one embodiment of the invention. A comparison of these two Figures shows that the base 13 of the leading edge is noticeably thicker in FIG. 2a than in FIG. 2b and that the amount of material necessary for reaching the thickness obtained in the case of the blade 1 of the invention would be huge in the absence of the stiffener 20 (see also the portion in dotted lines in FIG. 2a which represents the desired thickness for the shield 10 and its extent for obtaining a tapered cross section).

In one embodiment, the stiffener 20 extends over only a portion of the height of the aerodynamic surface 2. More particularly, the stiffener 20 may only extend over the upper portion 1a of the blade 1, i.e. the portion adjacent to the tip of the blade 1, the lower portion 1b (i.e. the portion adjacent to the root of the blade 1) lacking a stiffener 20. In fact, the Applicant has noticed the fact that the leading edge 14 of the lower portion 1b of the blade 1 could have a greater thickness insofar as its impact on the aerodynamic properties and the behavior of the blade 1 was less. In addition, the impact of objects, and particularly of birds, do not degrade the blade 1 in the lower portion 1b of the blade 1 and to not therefore risk detaching the shield 10.

In this embodiment, the profile of the shield 10 is therefore conventional in the lower portion 1b of the blade 1, i.e. thicker than in its upper portion 1a.

For example, for a fan blade 1, the stiffener 20 can extend over at most 70% of the height h of the aerodynamic surface 2, starting from the blade 1 tip, preferably over at most 60% of said height h. The blade 1 is then lacking a stiffener 20 in its lower portion 1b (over the rest of the height h of the aerodynamic surface 2, i.e. approximately 30% of its height h, preferably 40%).

Figure 3:
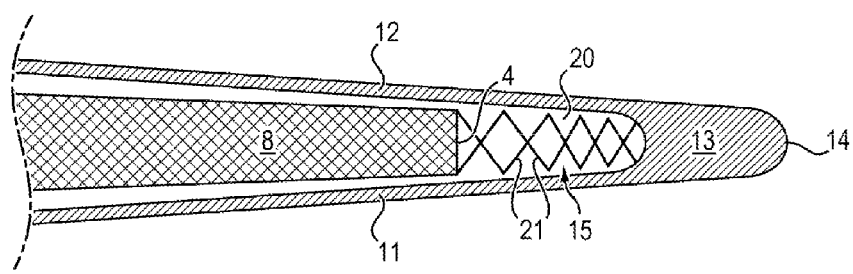
FIG. 3 is a transverse section view of a blade conforming to a second exemplary embodiment of the invention.

In one embodiment, the stiffener 20 is configured to stiffen the leading edge in the direction of the axis X, i.e. along the height of the aerodynamic surface 2, in order to limit the bending of the blade 1. The stiffener 20 then extends mainly in this direction of the blade 1. Exemplary embodiments of a stiffener 20 of this type are illustrated in FIGS. 2b and 3 and comprise a series of walls 21 forming at least one bellows. For example, the stiffener 20 can comprise a series of flat walls 21 connected two-by-two so as to form a continuous part between the leading edge 4 of the airfoil 8 and the base 13 of the shield 10. Each of the walls 21 has an edge supported against the pressure side fin 11 and an edge supported against the suction side fin 12 and thus forming the bellows (FIG. 2b). It is understood that here support means both a line support and a solid support between the flat walls 21 and the pressure side 11 and suction side 12 fins. If necessary, the stiffener 20 can comprise a second bellows of substantially identical shape, the walls 21 of which cross those of the first bellows (FIG. 3).

In the embodiments illustrated in FIG. 2b or in FIG. 3, an end wall of the bellows can be transverse to the blade, substantially perpendicular to the suction side fin 12 and the pressure side fin 11, by being designed to be glued to the leading edge 4 of the blade. In the embodiment associated with FIG. 2b, this transverse bellows wall connects to the free end of the inclined bellows wall opposite to the nose of the shield 10. In the embodiment associated with FIG. 3, this transverse bellows wall connects with the free ends of the last two inclined bellows walls 21 opposite to the nose of the shield 10. This transverse bellows end wall minimizes the quantity of adhesive for linking the leading edge 4 of the blade with the bellows constituting the stiffener 20.

Figure 4:
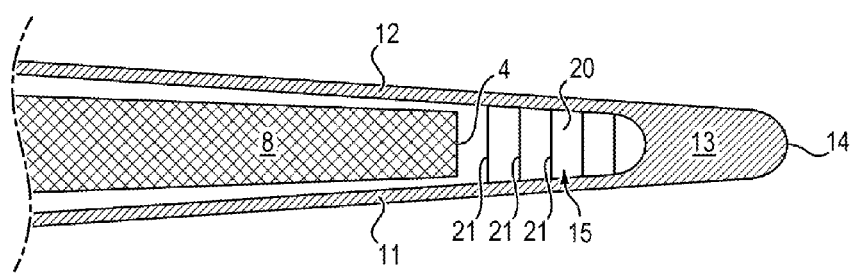
FIG. 4 is a transverse section view conforming to a third exemplary embodiment of the invention.

In a second embodiment, the stiffener 20 is configured to stiffen the blade 1 in a direction transverse to the axis X, i.e. in a direction parallel to the axis of revolution of the rotating portion. The stiffener 20 then extends mainly in this transverse direction. In this second embodiment illustrated in FIG. 4, the walls 21 are therefore transverse to the blade, substantially perpendicular to the suction side fin 12 and to the pressure side fin 11 while being connected to them for example by laser welding on the inside of the shield 10 or by gluing or by monolithic manufacturing by additive manufacturing.

The number, inclination and thickness of the walls 21 forming the bellows of the stiffener 20 can be optimized in design, depending on the application of the blade 1 and the stresses that it is likely to endure. In particular, the number, the inclination and the thickness of the walls depend on the following parameters: the number of blades, the speed of rotation, the diameter of the blade 10, the material of the leading edge 4 and of the composite material blade, the aerodynamic profile 2 including the thickness of the leading edge 4 of the blade 1, the thickness of the shield 10.

In the third embodiment, the stiffener 20 is configured to stiffen the blade 1 both in the direction of the axis X and in the transverse direction. The stiffener 20 can then comprise a grid array.

In this case of an embodiment, not shown, while being near the embodiment illustrated in FIG. 3, at least one of the ends of at least one of the walls 21 is connected for example by laser welding or by gluing to the corresponding fin 11, 12 of the shield 10, namely the suction side fin 12 and/or the pressure side fin 11.

The stiffener 20 and the shield 10 are metallic, of titanium for example.

Considering the complex shape of the shield 10 and of the stiffener 20, they are preferably produced by additive manufacturing.

The invention claimed is:

1. A blade of a rotating part of a turbomachine comprising:
    an airfoil made of a composite material comprising a fibrous reinforcement embedded in a polymer matrix, the airfoil comprising a leading edge and a trailing edge;
    a structural shield applied and attached to the leading edge or the trailing edge; and
    at least one stiffener formed integrally and in a single piece with the structural shield, the at least one stiffener extending into a cavity formed between the structural shield and one of the leading edge or the trailing edge and contacting the leading edge or the trailing edge so as to increase a stiffness of the blade,
    wherein the blade has an aerodynamic surface, the aerodynamic surface having a main extension direction defining a longitudinal axis of the blade which is substantially radial to an axis of revolution of the rotating part and a height corresponding to a distance between a lower limit of the aerodynamic surface and a tip of the blade, the at least one stiffener extending only from the tip of the blade over at most 70% of the height of said aerodynamic surface, such that the blade does not comprise a stiffener from a bottom of the blade over at least 30% of the height.

2. The blade of claim 1, wherein the at least one stiffener and the structural shield are produced by additive manufacturing.

3. The blade of claim 1, wherein the at least one stiffener comprises a plurality of walls forming at least one bellows.

4. The blade of claim 1, wherein the at least one stiffener extends along an extension direction, said extension direction being substantially parallel to the leading edge or to the trailing edge.

5. The blade of claim 1, wherein the at least one stiffener extends along an extension direction, said extension direction being substantially transverse to the leading edge or to the trailing edge.

6. The blade of claim 1, wherein the at least one stiffener and the structural shield are metallic.

7. The blade of claim 1, further comprising:
another structural shield applied and attached to the trailing edge,
and
another stiffener formed integrally and in a single piece with the another structural shield, the another stiffener extending between the trailing edge and the structural shield.

8. The blade of claim 7, wherein the another structural shield has an aerodynamic surface, the aerodynamic surface having a main extension direction defining a longitudinal axis of the blade which is substantially radial to an axis of revolution of the rotating part and a height corresponding to a distance between a lower limit of the aerodynamic surface and a tip of the blade, the stiffener extending over only a portion of the height of said aerodynamic surface.

9. The blade of claim 8, wherein the another stiffener extends over at most 70% of the height.

10. The blade of claim 7, wherein the another stiffener is adjacent to a tip of the blade.

11. The blade of claim 7, wherein the another stiffener and the structural shield are produced by additive manufacturing.

12. The blade of claim 7, wherein at least one of the at least one stiffener of the structural shield and the another stiffener of the another structural shield comprises a plurality of walls forming at least one bellows.

13. The blade of claim 7, wherein the another stiffener extends along an extension direction, said extension direction being substantially parallel to the leading edge or to the trailing edge.

14. The blade of claim 7, the another stiffener extends along an extension direction, said extension direction being substantially transverse to the leading edge or to the trailing edge.

15. The blade of claim 7, wherein the another stiffener and the another structural shield are metallic.

16. A fan comprising the blade according to claim 1.

17. The blade of claim 1, wherein the at least one stiffener extends over at most 60% of the height.

18. A blade of a rotating part of a turbomachine comprising:
an airfoil made of a composite material comprising a fibrous reinforcement embedded in a polymer matrix, the airfoil comprising a leading edge and a trailing edge;
a structural shield applied and attached to the leading edge or the trailing edge; and
at least one stiffener formed integrally and in a single piece with the structural shield, the at least one stiffener extending into a cavity formed between the structural shield and one of the leading edge or the trailing edge and contacting the leading edge or the trailing edge so as to increase a stiffness of the blade,
wherein the at least one stiffener comprises a plurality of walls forming at least one bellows, the plurality of walls arranged adjacent to each other in a direction that is perpendicular to the leading edge or the trailing edge to which the structural shield is applied and attached, adjacent walls of the plurality of walls having a gap located therebetween.

19. The blade of claim 18, wherein a first end surface of at least one wall of the plurality of walls is connected to a pressure side fin of the stiffener and the second end surface of the at least one wall of the plurality of walls is connected to a suction side fin of the stiffener.

20. The blade of claim 18, wherein, the at least one wall of the plurality of walls extends substantially parallel to the leading edge or to the trailing edge to which the structural shield is applied and attached.

21. The blade of claim 18, wherein the at least one wall of the plurality of walls extends substantially transverse to the leading edge or the trailing edge.

* * * * *